US010759479B2

(12) United States Patent
Fisher

(10) Patent No.: US 10,759,479 B2
(45) Date of Patent: Sep. 1, 2020

(54) FLATBED ENCLOSURE

(71) Applicant: Leslie Fisher, Stockton, CA (US)

(72) Inventor: Leslie Fisher, Stockton, CA (US)

( * ) Notice: Subject to any disclaimer, the term of this patent is extended or adjusted under 35 U.S.C. 154(b) by 23 days.

(21) Appl. No.: 16/215,853

(22) Filed: Dec. 11, 2018

(65) Prior Publication Data

US 2019/0283811 A1    Sep. 19, 2019

Related U.S. Application Data

(60) Provisional application No. 62/644,907, filed on Mar. 19, 2018.

(51) Int. Cl.
| | | |
|---|---|---|
| *B62D 33/027* | (2006.01) | |
| *B60J 7/12* | (2006.01) | |
| *B62D 33/023* | (2006.01) | |
| *B60J 7/16* | (2006.01) | |

(52) U.S. Cl.
CPC .............. *B62D 33/027* (2013.01); *B60J 7/12* (2013.01); *B60J 7/1621* (2013.01); *B62D 33/023* (2013.01)

(58) Field of Classification Search
CPC ....... B60J 7/1607; B60J 7/1621; B62D 33/02; B62D 33/027; B62D 33/02; B62D 33/023
USPC ............... 296/3, 100.06, 100.1, 64
See application file for complete search history.

(56) References Cited

U.S. PATENT DOCUMENTS

| | | | | |
|---|---|---|---|---|
| 2,324,508 A | * | 7/1943 | Johnson | B60N 2/3043 |
| | | | | 296/36 |
| 5,110,021 A | * | 5/1992 | Dawson, Jr. | B60J 7/141 |
| | | | | 224/405 |
| 7,246,839 B1 | * | 7/2007 | Nyberg | B60J 7/11 |
| | | | | 296/100.01 |
| 8,550,527 B1 | * | 10/2013 | Win | B60P 3/40 |
| | | | | 224/402 |
| 8,678,459 B1 | * | 3/2014 | Win | B60P 3/40 |
| | | | | 224/402 |

* cited by examiner

*Primary Examiner* — Dennis H Pedder

(57) ABSTRACT

The flatbed enclosure is an apparatus that provides a comfortable and secure environment within a truck. The apparatus includes a first bed cover, a second bed cover, a first side rack, a second rack, a hydraulic system, and a truck bed. The first bed cover and the second bed cover uphold the first side rack the second side rack, respectively, as well as open and close the truck bed. The first side rack and the second side rack serve as a rack to secure and uphold a variety of items while in a retracted configuration. The first side rack and the second side rack also serve as a bench while in an extended configuration. The hydraulic system automatically retracts and extends the first bed cover and the second bed cover. The truck bed upholds the first bed cover, the second bed cover, a variety of items, and individuals.

14 Claims, 16 Drawing Sheets

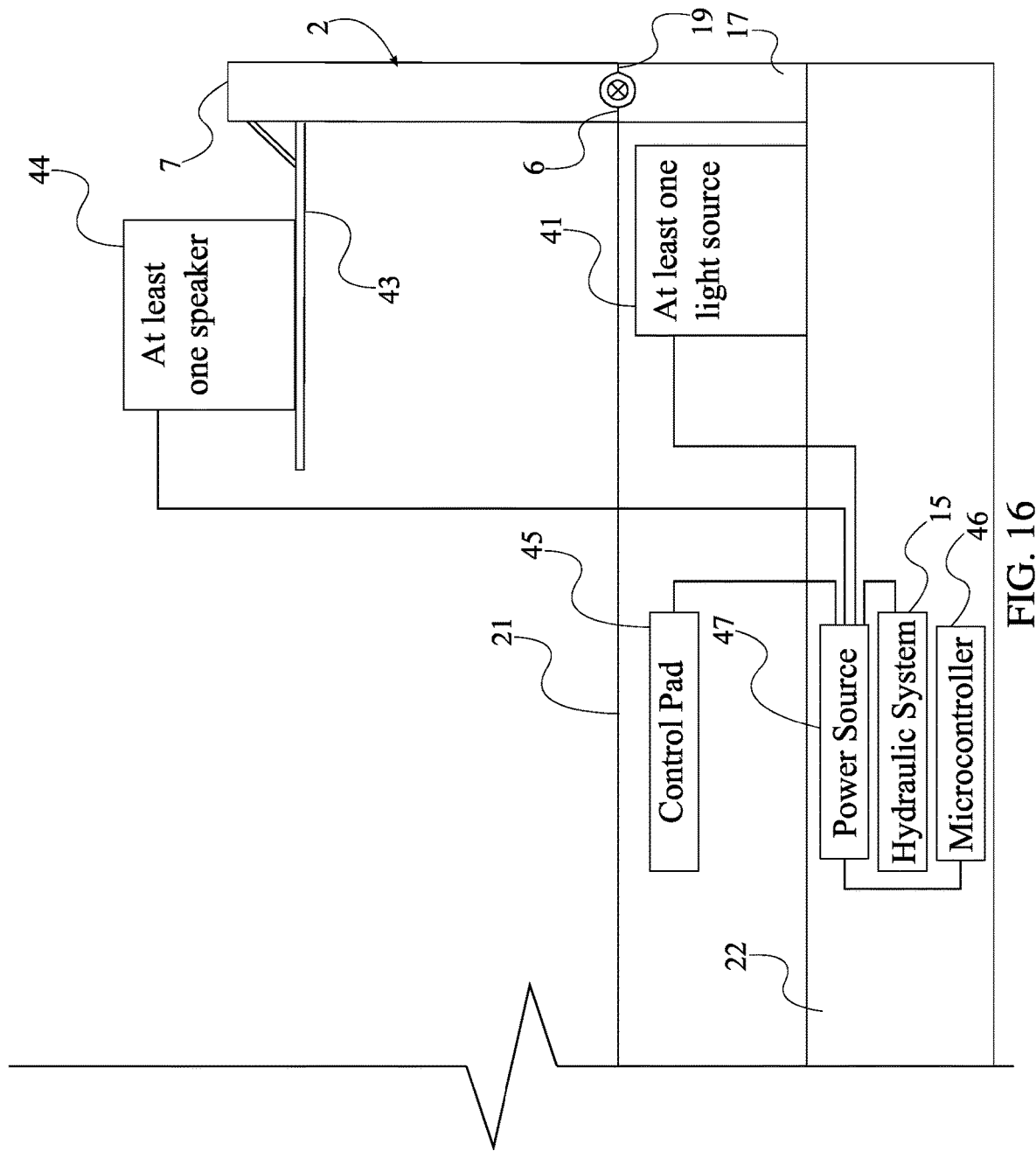

FLATBED ENCLOSURE

The current application claims priority to U.S. provisional application Ser. No. 62/644,907 filed on Mar. 19, 2018.

FIELD OF THE INVENTION

The present invention generally relates to trucks. More specifically, the present invention is a flatbed enclosure for a truck.

BACKGROUND OF THE INVENTION

Trucks are a multi-functional and multi-purpose vehicle that transports large items and people easily. Trucks may also serve as a common space for outdoor events and outdoor activities. People may rest in the bed of the truck while gazing at the stars, sit and relax in the bed of the truck at a tailgate, sleep in the bed of the truck while camping, and so on. The assembly and set up of a truck bed in order to make a comfortable environment for people, however, takes time and energy. The storage of seats and covers within the truck bed limits the amount of space available for other items that may need to be transported.

It is therefore an objective of the present invention to facilitate the assembly of a comfortable and safe environment within a truck. The present invention not only encloses a truck bed so that a private space is defined, the present invention maximizes the storage space of a truck bed as a first side rack and a second side rack are convertible from a side rack to a bench. A truck bed is further enclosed as a collapsible cover, a first lateral cover, and a second lateral cover closes openings between the first bed cover and the second bed cover of the truck bed.

BRIEF DESCRIPTION OF THE DRAWINGS

FIG. 16 is a schematic view of electrical connections the present invention with the second bed cover.

DETAIL DESCRIPTIONS OF THE INVENTION

Figure 1:
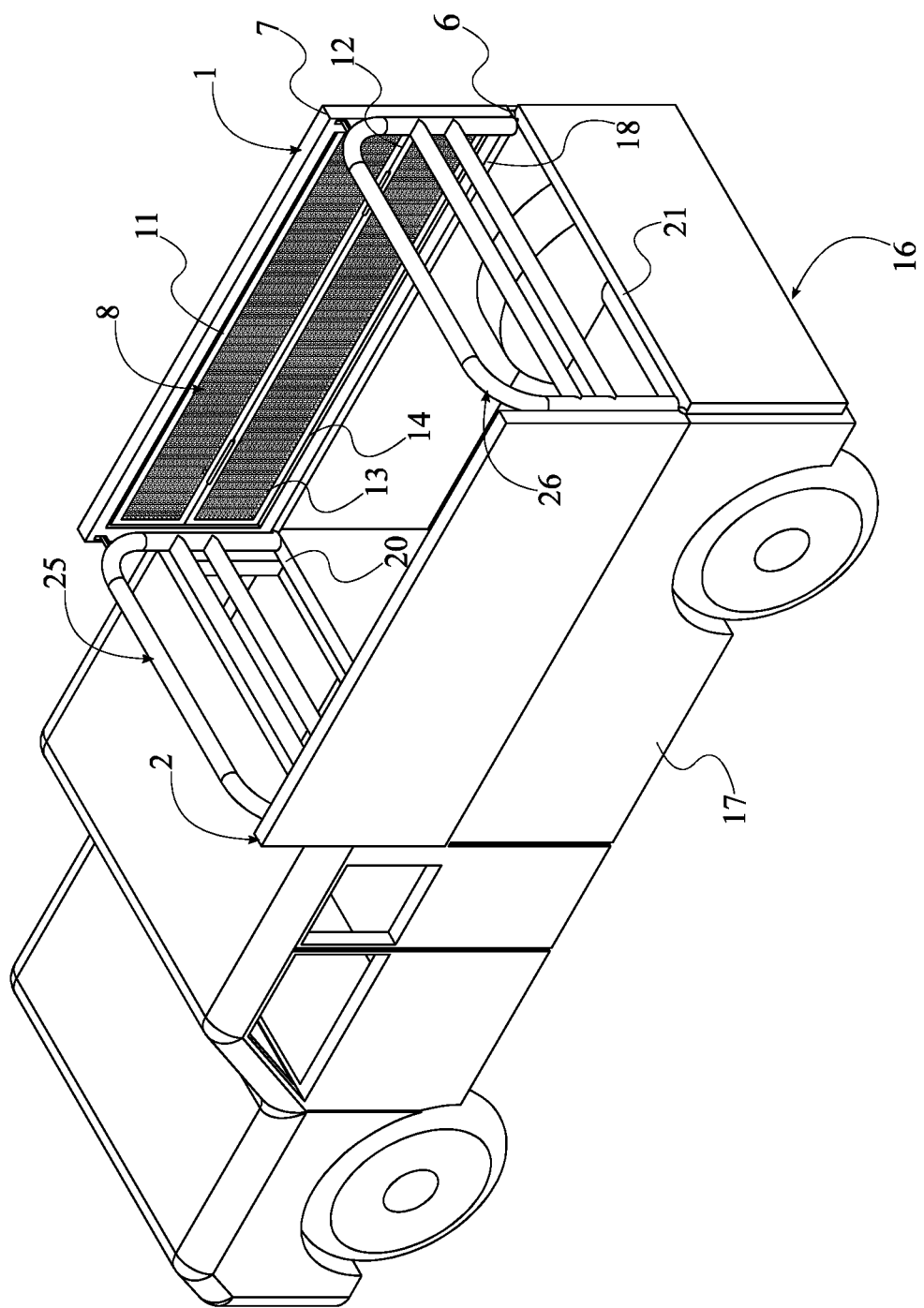
FIG. 1 is a rear perspective view of the present invention with a first side rack and a second side rack in a retracted configuration.

All illustrations of the drawings are for the purpose of describing selected versions of the present invention and are not intended to limit the scope of the present invention.

The present invention is a flatbed enclosure that protects individuals within a truck bed from outdoor elements. The present invention allows individuals to remain within a truck bed and move within the truck bed while being in a defined space. In order to comfortably and safely house individuals, the present invention comprises a first bed cover 1, a second bed cover 2, a first side rack 8, a second side rack 9, a hydraulic system 15, and a truck bed 16, seen in FIG. 1, FIG. 4, FIG. 6, FIG. 7, FIG. 13, FIG. 14, FIG. 15, and FIG. 16. The first bed cover 1 and the second bed cover 2 together seal the truck bed 16, as well as uphold the first side rack 8 and the second side rack 9, respectively. The first side rack 8 and the second side rack 9 suspend a variety of items throughout transportation. The first side rack 8 and the second side rack 9 further serve as benches. The hydraulic system 15 automatically retracts and extends the first bed cover 1 and the second bed cover 2. The truck bed 16 upholds the first bed cover 1, the second bed cover 2, the first side rack 8, and the second side rack 9. More specifically, the truck bed 16 comprises a frame 17 and a base 22. The base 22 upholds the frame 17 and mounts the present invention onto a chassis, preferably of a truck. The frame 17 encloses the base 22. The truck bed 16 is preferably part of a truck that is able to transport the present invention and individuals. The truck bed 16 comprises a frame 17 and a base 22 in order to house a variety of items and individuals.

The overall configuration of the aforementioned components allows a truck to comfortably and safely house both items and individuals. As seen in FIG. 1, FIG. 2, FIG. 3, FIG. 4, and FIG. 5, the frame 17 is perimetrically fixed to the base 22 and is oriented perpendicular to the base 22, effectively surrounding individuals and items. The first bed cover 1 and the second bed cover 2 are positioned adjacent the frame 17, opposite the base 22, in order to seal the truck bed 16 for storage. Moreover, the first bed cover 1 is hingedly engaged to a first lateral edge 18 of the frame 17. Similarly, the second bed cover 2 is hingedly engaged to a second lateral edge 19 of the frame 17. The first lateral edge 18 is positioned opposite the second lateral edge 19 across the truck bed 16. The first bed cover 1 supports and orients the first side rack 8 as the first side rack 8 is positioned adjacent an inner surface 10 of the first bed cover 1 and is slidably engaged with the first bed cover 1. Similarly, the second bed cover 2 supports and orients the second side rack 9 as the second side rack 9 is positioned adjacent an inner surface 10 of the second bed cover 2 and is slidably engaged with the second bed cover 2. The first bed cover 1 and the second bed cover 2 are automatically controlled as the first bed cover 1 and the second bed cover 2 are operatively coupled with the hydraulic system 15, wherein the hydraulic system 15 opens and closes a main opening 23 of the track bed with the first bed cover 1 and the second bed cover 2. The main opening 23 of the truck bed 16 is positioned opposite the base 22 of the truck bed 16, opposite the frame 17.

Figure 6:
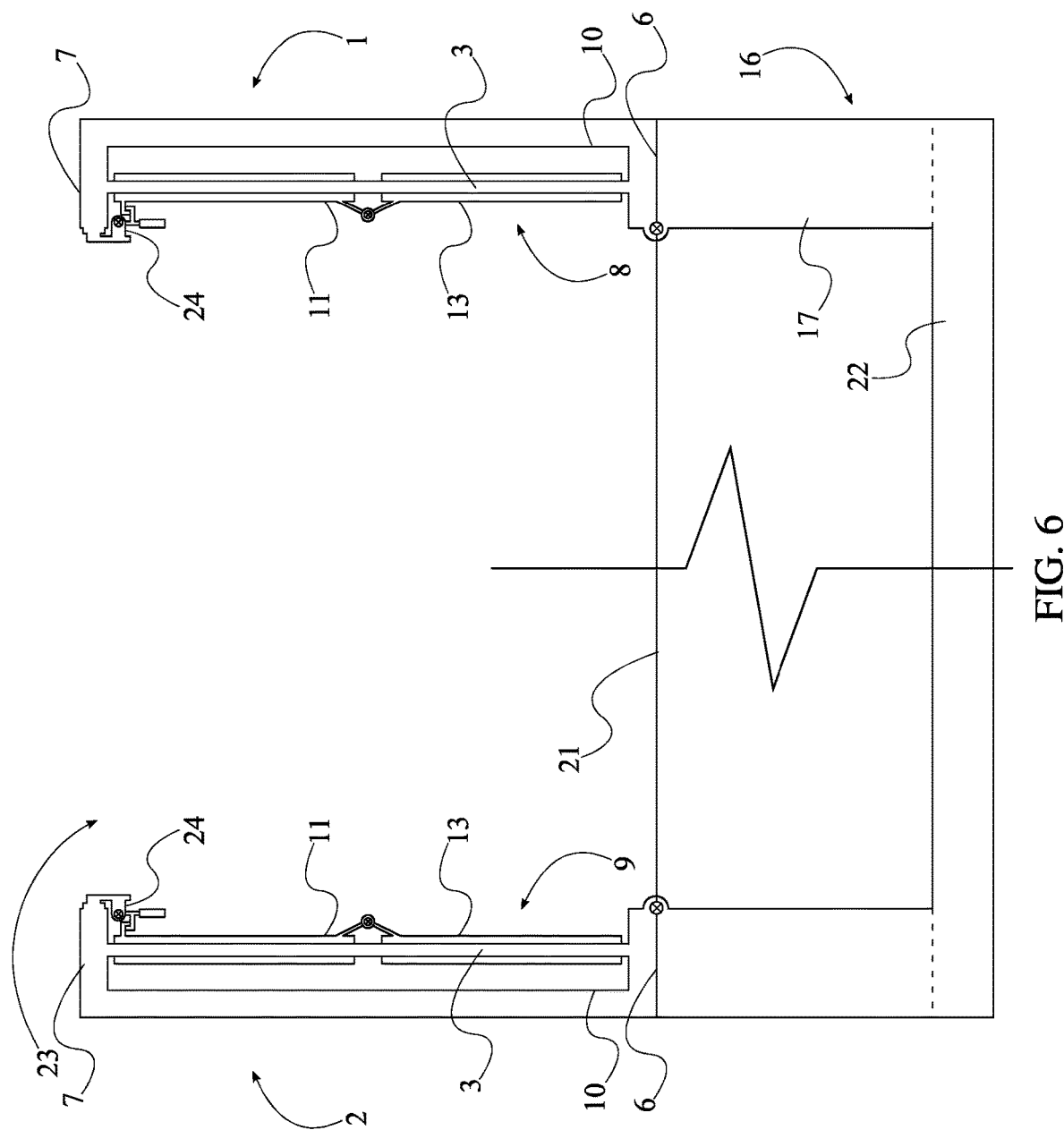
FIG. 6 is a front schematic view of the latch mechanism and the first side rack and the second side rack in the retracted configuration of the present invention.
Figure 7:
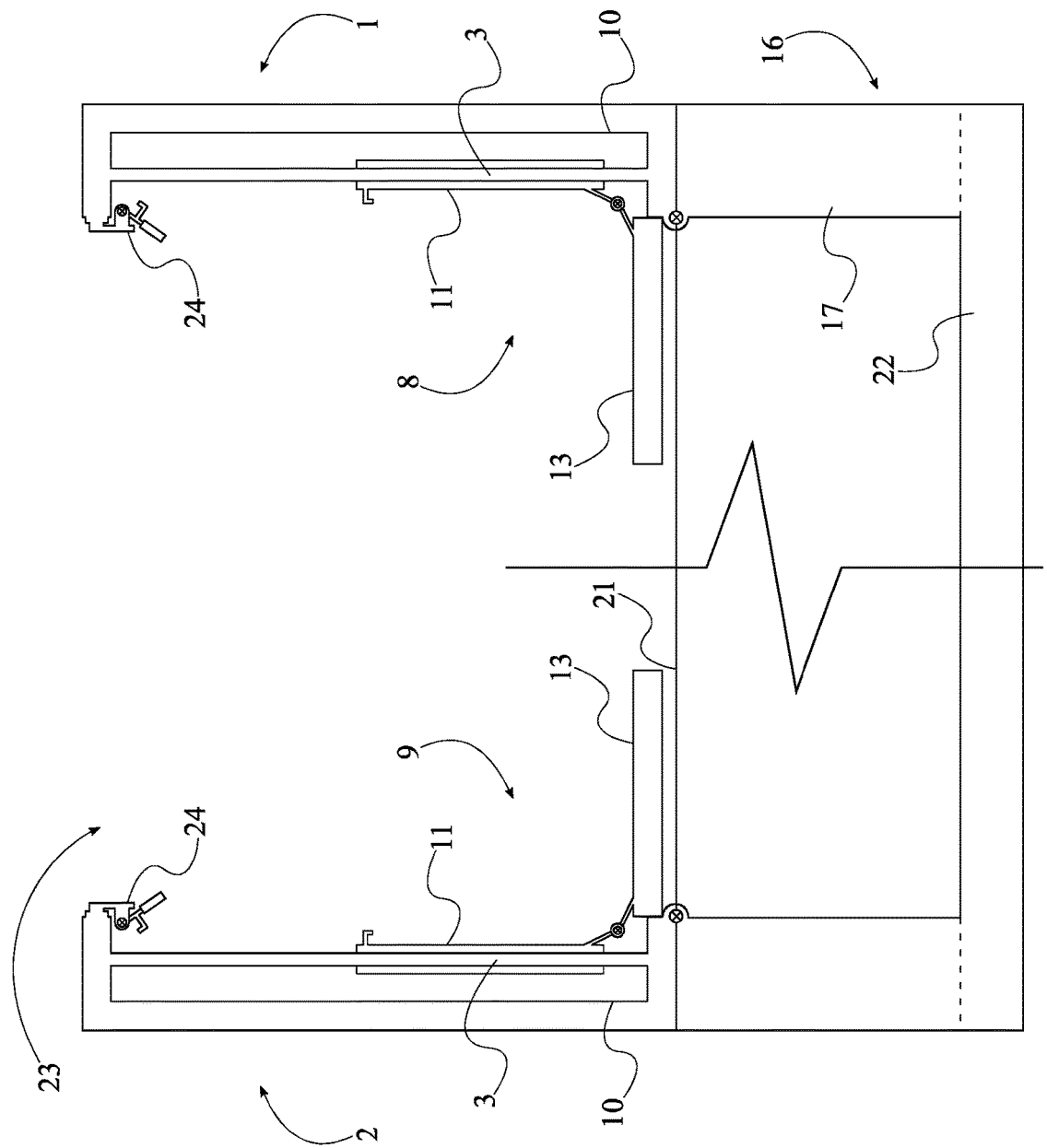
FIG. 7 is a front schematic view of the latch mechanism and the first side rack and the second side rack in the extended configuration of the present invention.
Figure 8:
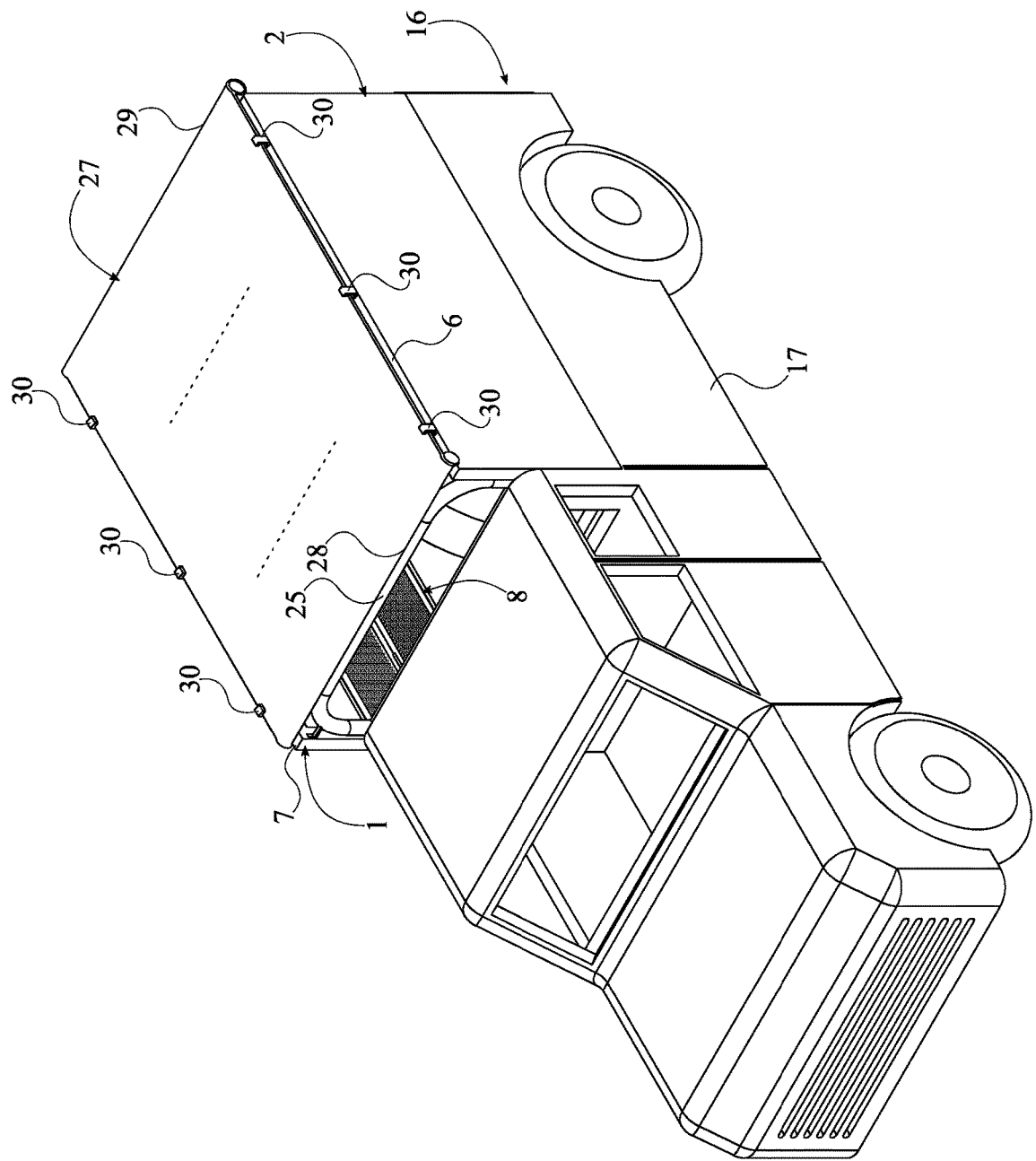
FIG. 8 is a front perspective view of the present invention with a collapsible cover.

In order to release and lock the first side rack 8 and the second side rack 9 from the first bed cover 1, respectively, the present invention comprises a latch mechanism 24, seen in FIG. 6 and FIG. 7. The first side rack 8 comprises a backrest panel 11 and a bench panel 13, structurally able to support individuals sitting and resting on the first side rack 8. The first side rack 8 serves as both a rack and a bench as the first bed cover 1 comprises a first track 3 and a second track 5. The first track 3 and the second track 5 are positioned opposite each other along the first bed cover 1 and are fixed to the inner surface 10 of the first bed cover 1. The backrest panel 11 is hingedly connected to the bench panel 13 and is oriented parallel with the first bed cover 1. The backrest panel 11 and the bench panel 13 are operatively coupled with the latch mechanism 24, wherein the latch mechanism 24 locks and releases both the backrest panel 11 and the bench panel 13 along the first track 3 and the second track 5. The backrest panel 11 and the bench panel 13 are therefore retracted and stored with the latch mechanism 24. The backrest panel 11 and the bench panel 13 are also extended and released with the latch mechanism 24.

Figure 2:
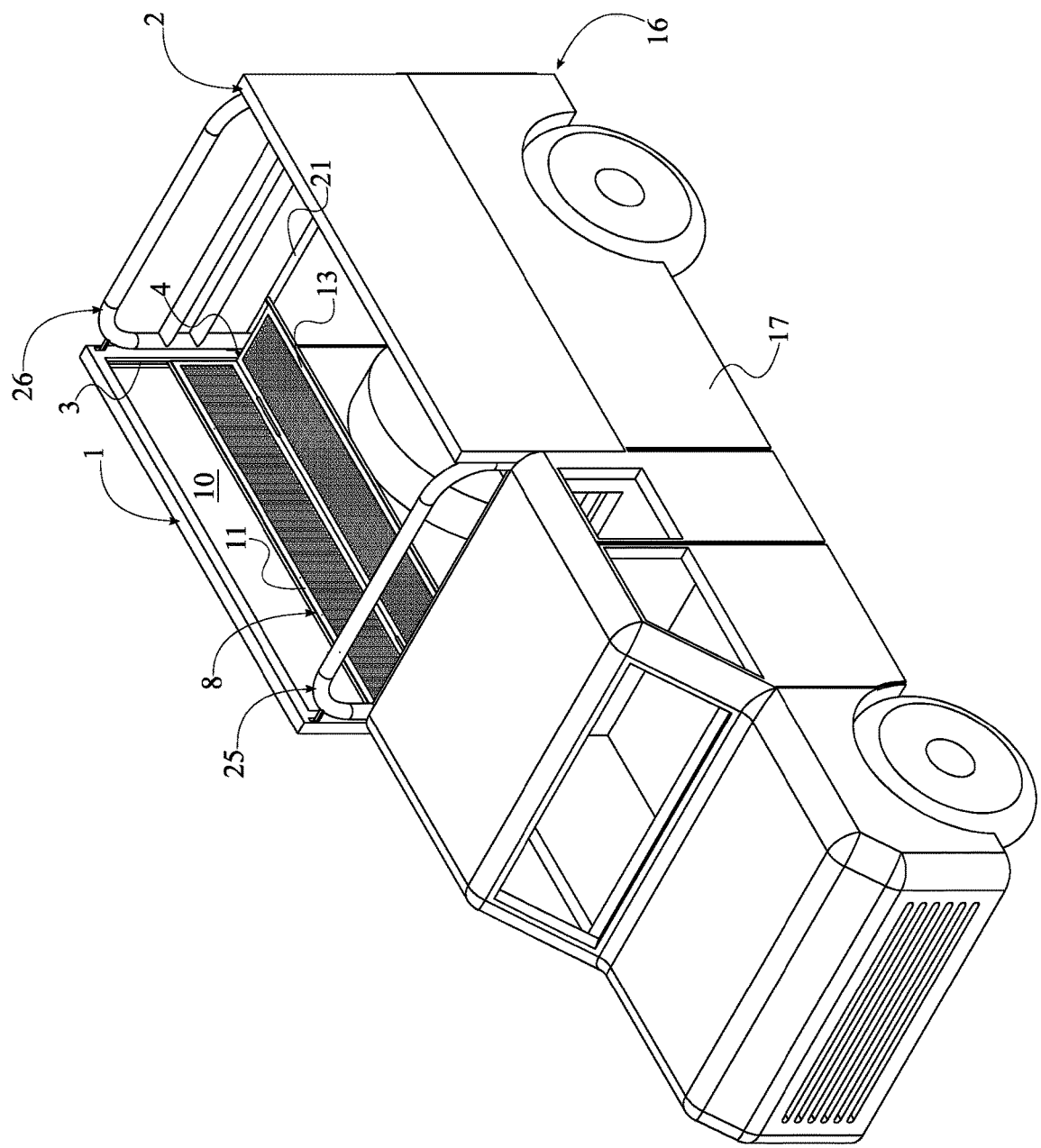
FIG. 2 is a front perspective view of the present invention with the first side rack in an extended configuration.
Figure 3:
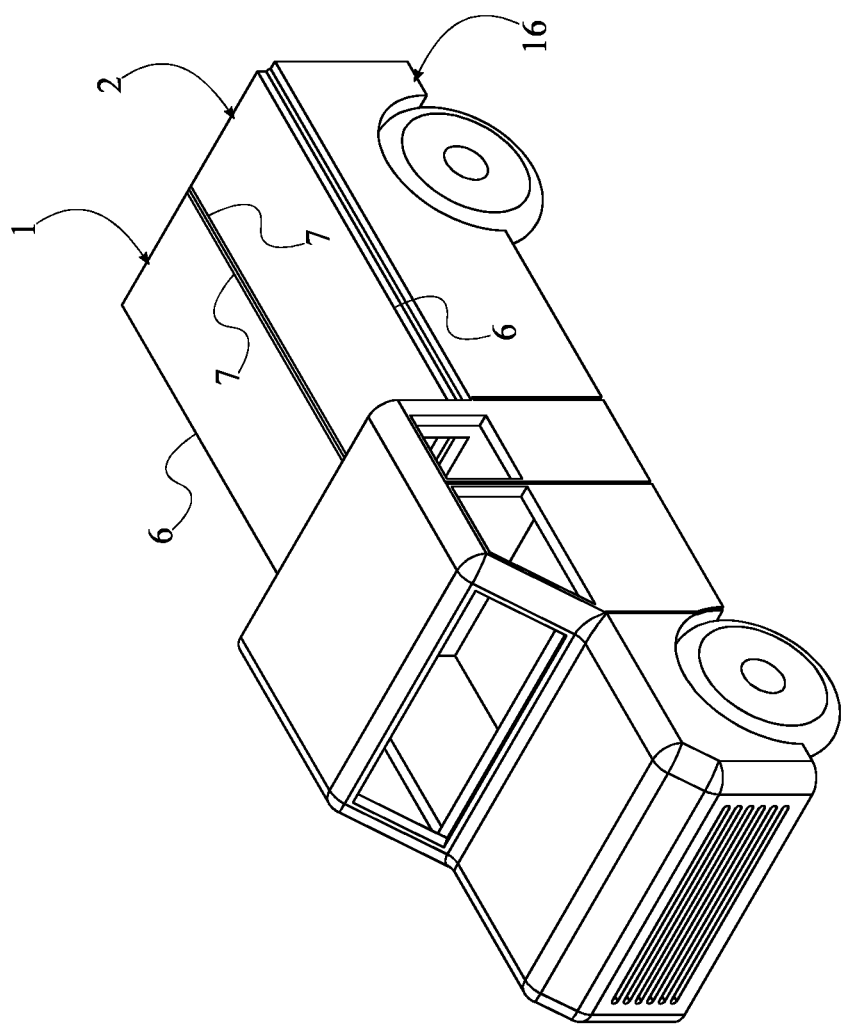
FIG. 3 is a front perspective view of the present invention with a first bed cover and a second bed cover in a retracted configuration.

Individuals may sit on the first side rack 8 while in an extended configuration, as shown in FIG. 2 and FIG. 7. The first side rack 8 is in an extended configuration while the backrest panel 11 is positioned in between the first track 3 and the second track 5. The bench panel 13 is externally positioned with the first track 3 and the second track 5, adjacent a first opening 4 of the first track 3. The first opening 4 allows the bench panel 13 to traverse past the first track 3 and second track 5 and be accessible as a seat for an individual. In order for individuals to sit on the bench panel 13, the bench panel 13 is oriented parallel to the base 22 of the truck bed 16. Moreover, a first lateral edge 12 of the backrest panel 11 is positioned adjacent a fixed edge 6 of the first bed cover 1. The fixed edge 6 of the first bed cover 1 is positioned adjacent the first lateral edge 18 of the frame 17 of the truck bed 16. A free edge 7 of the first bed cover 1 is positioned opposite the fixed edge 6 of the first bed cover 1.

Figure 4:
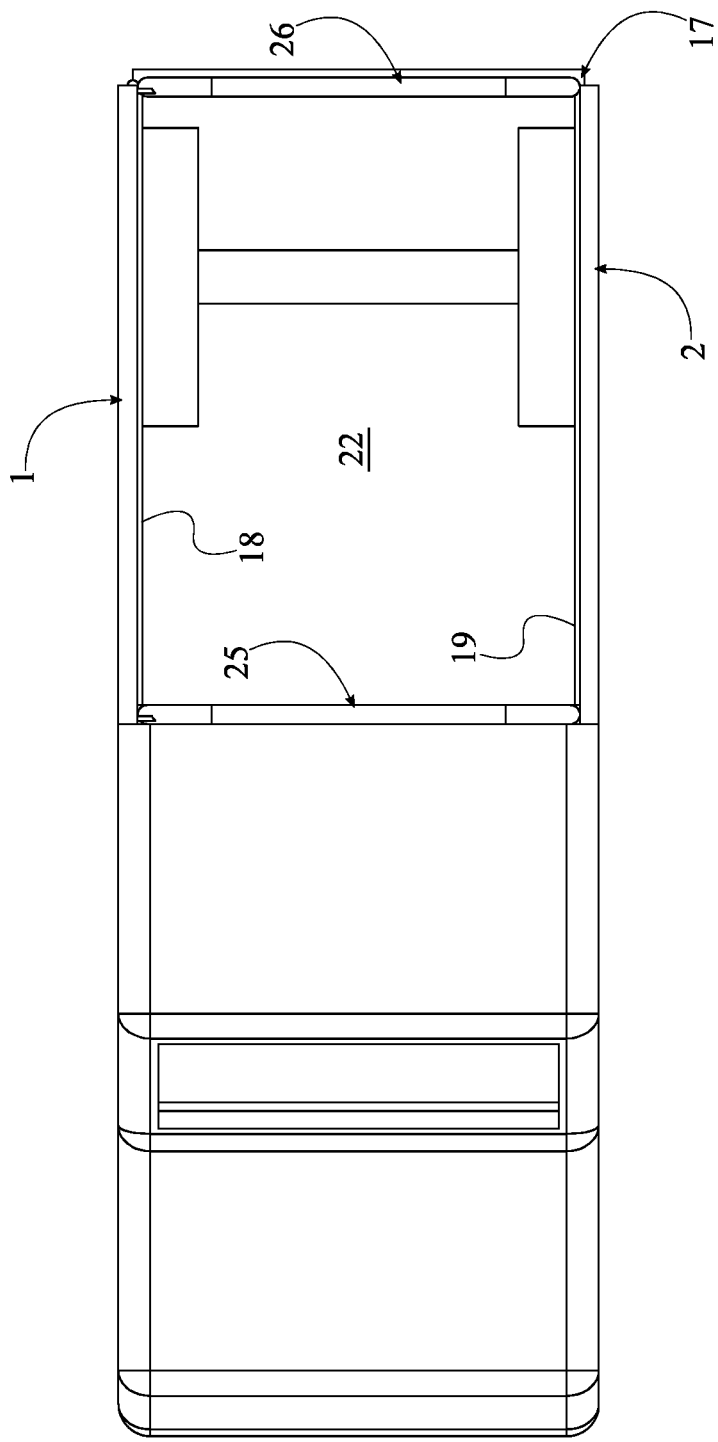
FIG. 4 is a top side view of the present invention with the first bed cover and the second bed cover in an extended configuration, and the first side rack and the second side rack in the retracted configuration.

The first side rack 8 is securely stored while in a retracted configuration, shown in FIG. 1, FIG. 4, and FIG. 6. The backrest panel 11 and the bench panel 13 are positioned in between the first track 3 and the second track 5. The bench panel 13 is oriented parallel to the backrest panel 11 thereby allowing a variety of items to be stored within the truck bed 16. Moreover, the first lateral edge 14 of the bench panel 13 is positioned adjacent a fixed edge 6 of the first bed cover 1. The fixed edge 6 of the first bed cover 1 is positioned adjacent the first lateral edge 18 of the frame 17 of the truck bed 16. A free edge 7 of the first bed cover 1 is positioned opposite the fixed edge 6 of the first bed cover 1. The bench panel 13 is secured between the first track 3 and the second track 5 with the latch mechanism 24 as the bench panel 13 is positioned in between the fixed edge 6 of the bed cover and the backrest panel 11.

Similar to the first side rack 8, in order to release and lock the second side rack 9 from the second bed cover 2, respectively, the present invention comprises a latch mechanism 24, also seen in FIG. 6 and FIG. 7. The second side rack 9 comprises a backrest panel 11 and a bench panel 13, structurally able to support individuals sitting and resting on the second side rack 9. The second side rack 9 serves as both a rack and a bench as the second bed cover 2 comprises a first track 3 and a second track 5. The first track 3 and the second track 5 are positioned opposite each other along the second bed cover 2 and are fixed to the inner surface 10 of the second bed cover 2. The backrest panel 11 is hingedly connected to the bench panel 13 and is oriented parallel with the second bed cover 2. The backrest panel 11 and the bench panel 13 are operatively coupled with the latch mechanism 24, wherein the latch mechanism 24 locks and releases both the backrest panel 11 and the bench panel 13 along the first track 3 and the second track 5. The backrest panel 11 and the bench panel 13 are therefore retracted and stored with the latch mechanism 24. The backrest panel 11 and the bench panel 13 are also extended and released with the latch mechanism 24.

Figure 5:
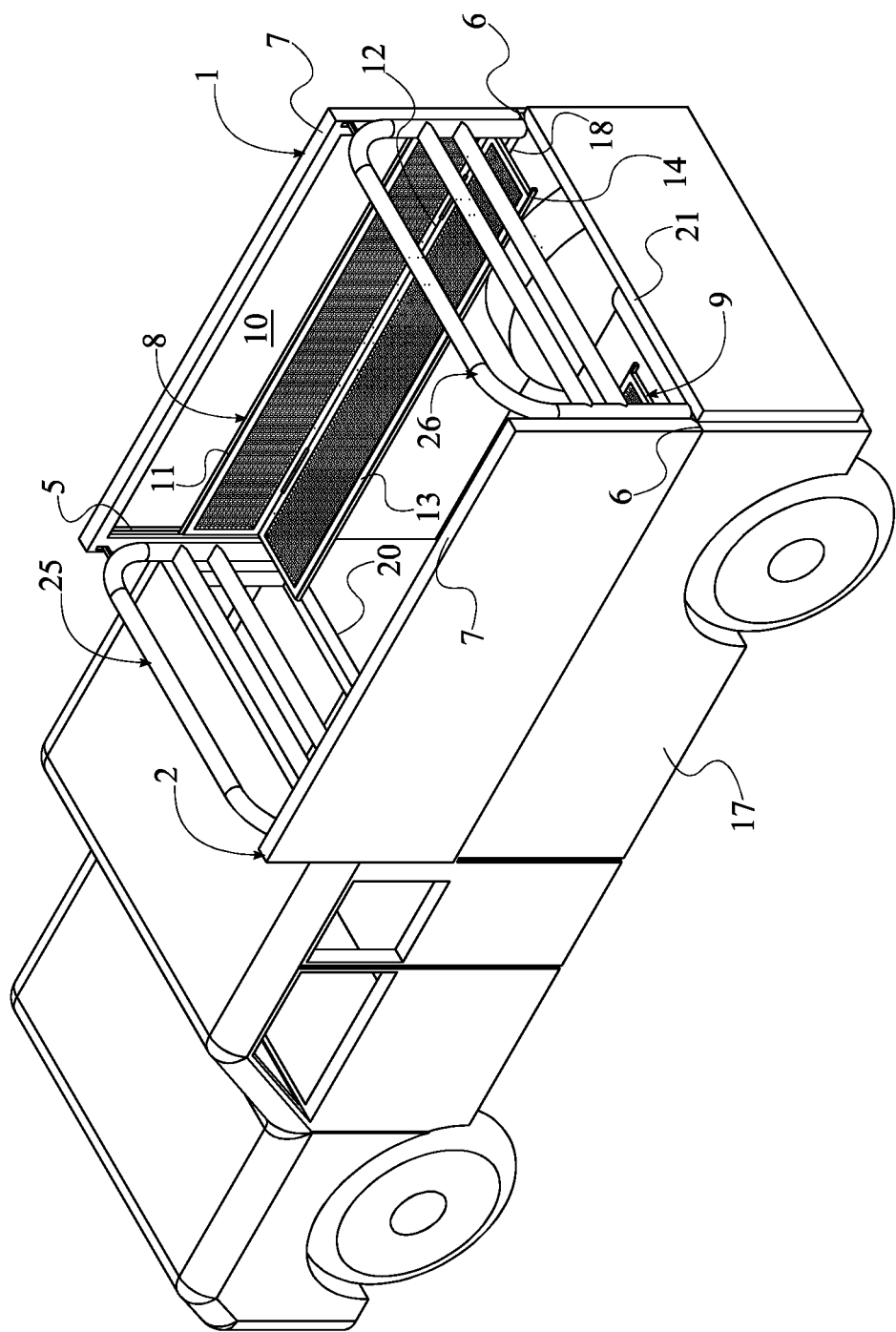
FIG. 5 is a rear perspective view of the present invention with the first side rack and the second side rack in the extended configuration.

Individuals may sit on the second side rack 9 while in an extended configuration, shown in FIG. 5 and FIG. 7. The second side rack 9 is in an extended configuration while the backrest panel 11 is positioned in between the first track 3 and the second track 5. The bench panel 13 is externally positioned with the first track 3 and the second track 5, adjacent a first opening 4 of the first track 3. The first opening 4 allows the bench panel 13 to traverse past the first track 3 and second track 5 and be accessible as a seat for an individual. In order for individuals to sit on the bench panel 13, the bench panel 13 is oriented parallel to the base 22 of the truck bed 16. Moreover, a first lateral edge 12 of the backrest panel 11 is positioned adjacent a fixed edge 6 of the second bed cover 2. The fixed edge 6 of the second bed cover 2 is positioned adjacent the first lateral edge 18 of the frame 17 of the truck bed 16. A free edge 7 of the second bed cover 2 is positioned opposite the fixed edge 6 of the second bed cover 2.

The second side rack 9 is securely stored while in a retracted configuration, shown in FIG. 4 and FIG. 6. While in the retracted configuration, the backrest panel 11 and the bench panel 13 are positioned in between the first track 3 and the second track 5. The bench panel 13 is oriented parallel to the backrest panel 11 thereby allowing a variety of items to be stored within the truck bed 16. Moreover, the first lateral edge 12 of the bench panel 13 is positioned adjacent a fixed edge 6 of the second bed cover 2. The fixed edge 6 of the second bed cover 2 is positioned adjacent the first lateral edge 18 of the frame 17 of the truck bed 16. A free edge 7 of the second bed cover 2 is positioned opposite the fixed edge 6 of the second bed cover 2. The bench panel 13 is secured between the first track 3 and the second track 5 with the latch mechanism 24 as the bench panel 13 is positioned in between the fixed edge 6 of the bed cover and the backrest panel 11.

An enclosed environment defined by the first bed cover 1 and the second bed cover 2 in an extended configuration with the truck bed 16 is further defined and reinforced by a first railing 25 and a second railing 26. The first railing 25 is positioned in between the first bed cover 1 and the second bed cover 2, seen in FIG. 1, FIG. 2, FIG. 4 and FIG. 5. The first railing 25 traverses a long a third lateral edge 20 of the frame 17 of the truck bed 16. The third lateral edge 20 is terminally positioned in between the first lateral edge 18 and the second lateral edge 19 of the frame 17. The third lateral edge 20 is preferably positioned adjacent and external to a cabin of the truck. In order to maximize the enclosed environment, the first railing 25 is oriented perpendicular to the base 22 of the truck bed 16 and is removably attached to the first bed cover 1. Similarly, the second railing 26 is positioned in between the first bed cover 1 and the second bed cover 2. The second railing 26 traverses along a fourth lateral edge 21 of the frame 17. The fourth lateral edge 21 is terminally positioned in between the first lateral edge 18 and the second lateral edge 19 of the frame 17. More specifically, the fourth lateral edge 21 is positioned opposite the third lateral edge 20 of frame 17. The second railing 26 maximizes the enclosed environment as the second railing 26 is oriented perpendicular to the base 22 of the truck bed 16. Similar to the first railing 25, the second railing 26 is removably attached to the second bed cover 2. As the first railing 25 and the second railing 26 are removably attached to the first bed cover 1, the present invention may be converted from an extended configuration to a retracted configuration, allowing the truck bed 16 to be closed with the first bed cover 1 and the second bed cover 2.

In order to shield individuals within the truck bed 16 from inclement weather or simply shade individuals from the sun, an alternate embodiment of the present invention may further comprise a collapsible cover 27 and a plurality of main fasteners 30, seen in FIG. 8, FIG. 9, FIG. 10, FIG. 11, and FIG. 12. The collapsible cover 27 serves as a roof as the collapsible cover 27 is positioned adjacent the first bed cover 1 and the second bed cover 2, opposite the frame 17. The plurality of main fasteners 30 secures the collapsible cover 27 to the first bed cover 1 and the second bed cover 2. A free edge 7 of the first bed cover 1 is positioned opposite a fixed edge 6 of the first bed cover 1. The fixed edge 6 of the first bed cover 1 is hingedly engaged to the first lateral edge 18 of the frame 17. The free edge 7 of the first bed cover 1 pivots about the free edge 7. Similarly, a free edge 7 of the second bed cover 2 is positioned opposite a fixed edge 6 of the second bed cover 2. The fixed edge 6 of the second bed cover 2 is hingedly engaged to the second lateral edge 19 of the frame 17. More specifically, the fixed edge 6 of the first bed cover 1 and the fixed edge 6 of second bed cover 2 are positioned adjacent the frame 17. The free edge 7 of the second bed cover 2 pivots about the free edge 7. In order for first bed cover 1 and the second bed cover 2 to support the collapsible cover 27, the first bed cover 1 and the second bed cover 2 is in an extended configuration. In the extended configuration the free edge 7 of the first bed cover 1 is positioned opposite the free edge 7 of the second bed cover 2 across the collapsible cover 27. The collapsible cover 27 effectively shields individuals within the truck bed 16 as the collapsible cover 27 traverses from the first bed cover 1 to the second bed cover 2. Moreover, the collapsible cover 27 is removably attached along the free edge 7 of the first bed cover 1 and the free edge 7 of the second bed cover 2 with the plurality of main fasteners 30. The plurality of main fasteners 30 may include, but are not limited to, magnetic tabs, non-scratch clips, and elastic ties.

Figure 9:
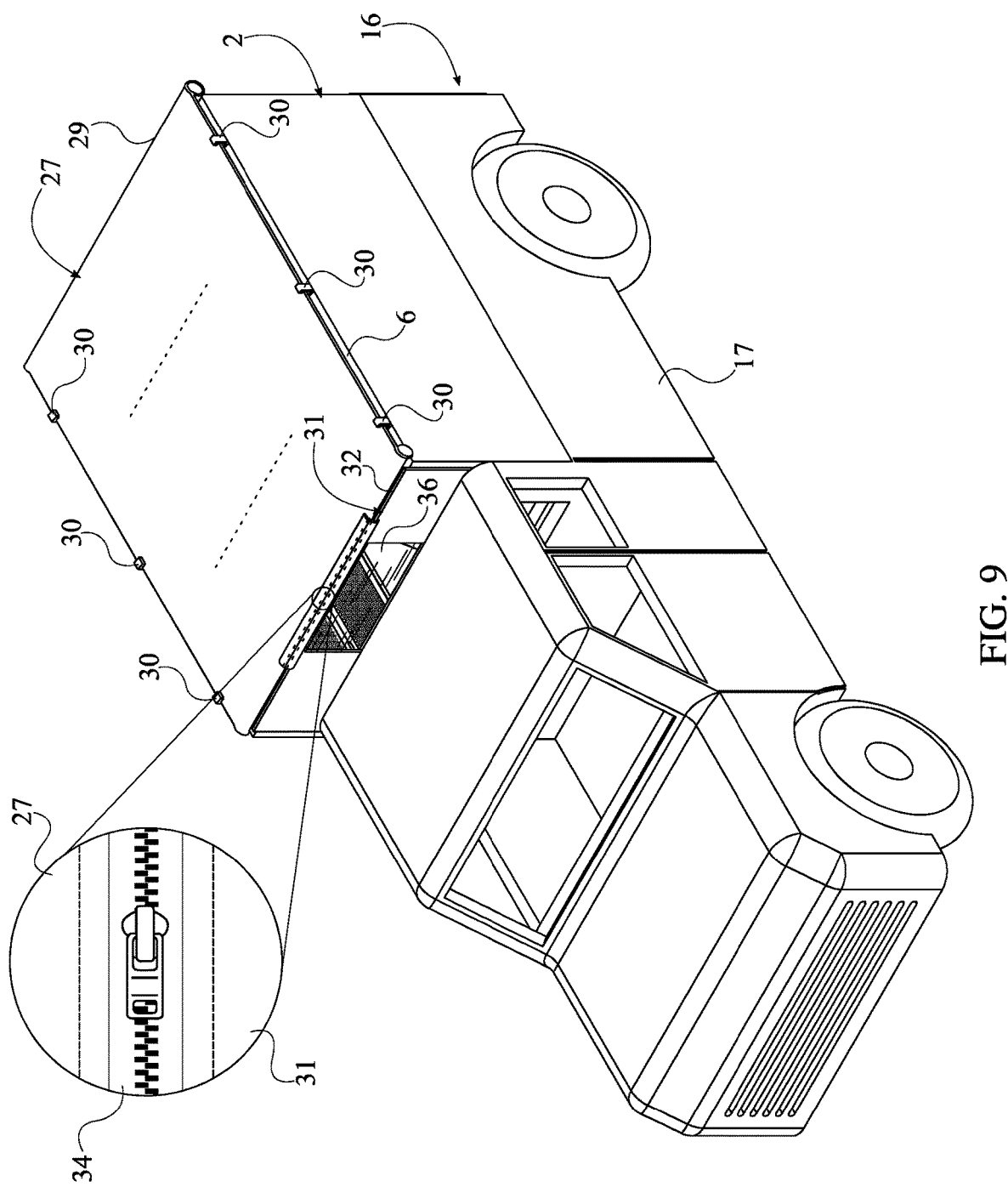
FIG. 9 is a front perspective view of the present invention with a collapsible cover and a first lateral cover.
Figure 11:
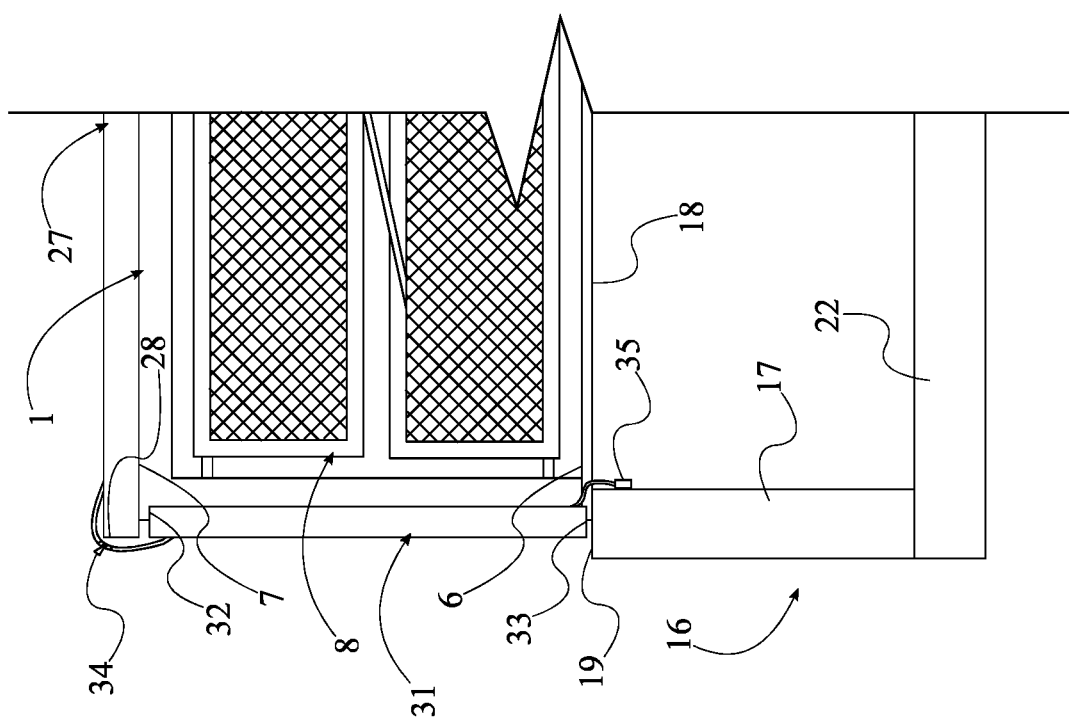
FIG. 11 is a schematic view of the present invention of the collapsible cover and the first lateral cover with the truck bed and the first bed cover.

The enclosed environment is further sealed as an alternate embodiment of the present invention comprises a first lateral cover 31, at least one first supplementary fastener 34, and at least one second supplementary fastener 35, shown in FIG. 9 and FIG. 11. The first lateral cover 31 shields the first railing 25 and the corresponding opening between the first bed cover 1 and the second bed cover 2. The at least one first supplementary fastener 34 secures and positions the first lateral cover 31 with the collapsible cover 27. The at least one first supplementary fastener 34 is preferably velcro or a series of hooks and ties the connects the first lateral cover 31 with the collapsible cover 27. The at least one second supplementary fastener 35 prevents the first lateral cover 31 from flapping as the at least one second supplementary fastener 35 secures the first lateral cover 31 to the truck bed 16. The at least one second supplementary fastener 35 is preferably a series of magnets that connects the first lateral cover 31 to the truck bed 16.

The first lateral cover 31 encloses the truck bed 16 with the collapsible cover 27, the first truck bed 16, and the second truck bed 16 as the first lateral cover 31 is terminally positioned adjacent the collapsible cover 27 and is oriented perpendicular with the collapsible cover 27, seen also in FIG. 9 and FIG. 11. More specifically, a first edge 32 of the first lateral cover 31 traverses along a first edge 28 of the collapsible cover 27. The first edge 28 of the collapsible cover 27 is positioned in between the first bed cover 1 and the second bed cover 2, preferably beside the cabin of the truck. A second edge 33 of the first lateral cover 31 is positioned opposite the first edge 32 of the first lateral cover 31, across the first lateral cover 31. The second edge 33 of the first lateral cover 31 is positioned adjacent the frame 17 of the truck bed 16. In order to effectively secure and position the first lateral cover 31, the first edge 32 of the first lateral cover 31 is removably attached to the first edge 28 of the collapsible cover 27 with the at least one first supplementary fastener 34. Moreover, the second edge 33 of the first lateral cover 31 is removably attached to the frame 17 of the truck bed 16 with the at least one second supplementary fastener 35.

In this alternate embodiment of the present invention, the present invention may further comprise a first window 36, seen in FIG. 9. The first window 36 allows individuals to view the surrounding environment between the first bed cover 1 and the second bed cover 2. The first window 36 also allows individuals within the truck bed 16 to view the surrounding environment through the first railing 25, if the first railing 25 is connected to the first bed cover 1. The first window 36 is preferably a durable, transparent plastic layer in order to preserve the flexible structure of the first lateral cover 31. The first window 36 is integrated into the first lateral cover 31, thereby allowing individuals to have a view of the surrounding environment while positioned within the truck bed 16.

Figure 10:
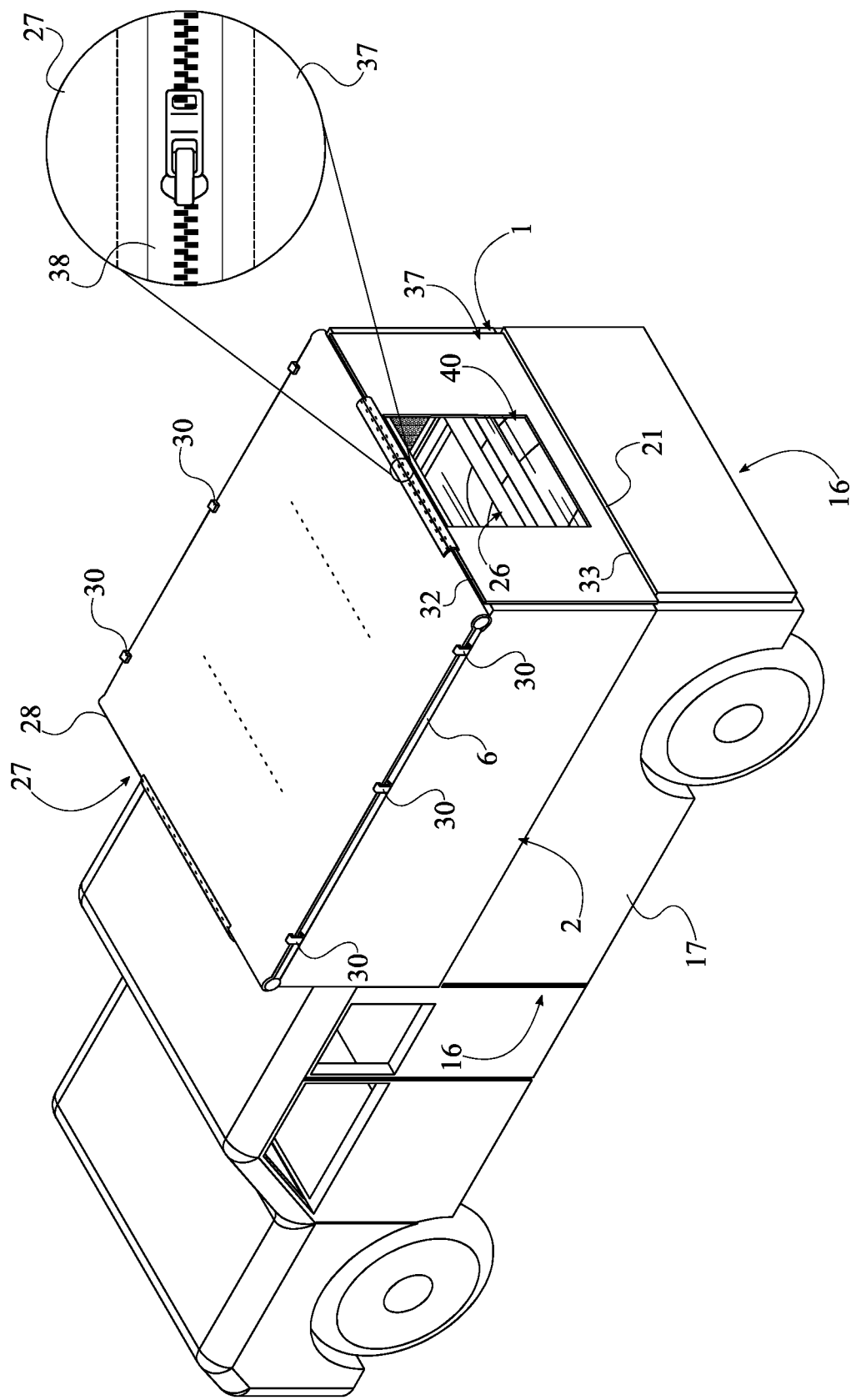
FIG. 10 is a rear perspective view of the present invention with the collapsible cover, the first lateral cover, and a second lateral cover.
Figure 12:
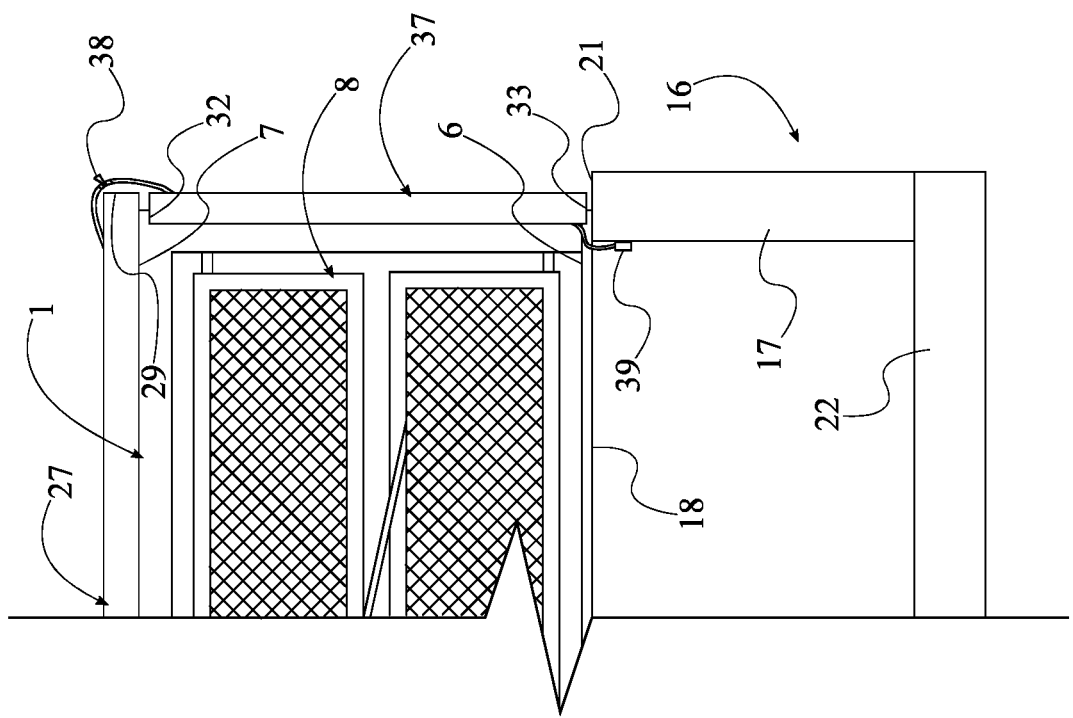
FIG. 12 is a schematic view of the present invention of the collapsible cover and the second lateral cover with the truck bed and the first bed cover.
Figure 13:
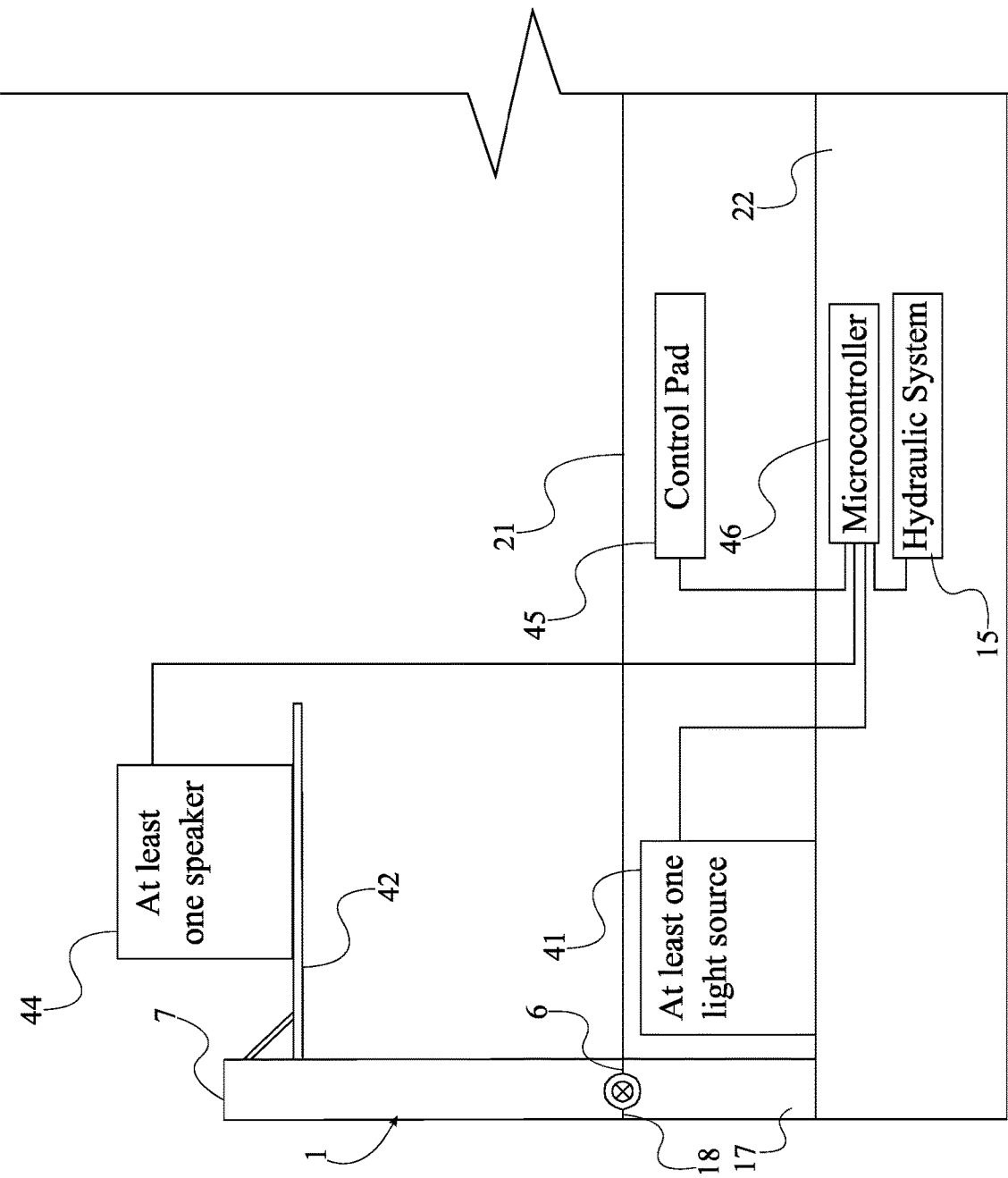
FIG. 13 is a schematic view of electronic connections the present invention with the first bed cover.
Figure 14:
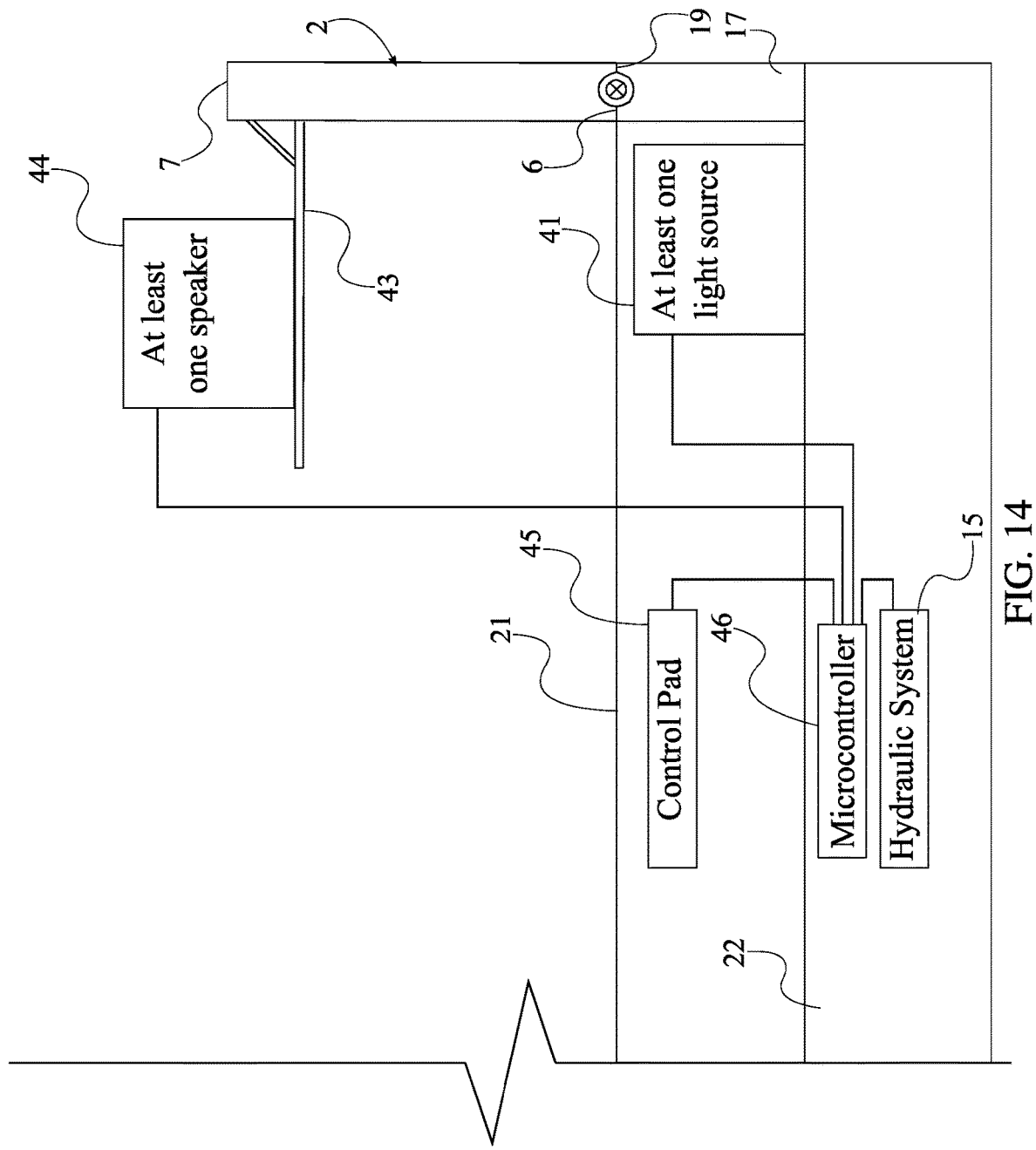
FIG. 14 is a schematic view of electronic connections the present invention with the second bed cover.
Figure 15:
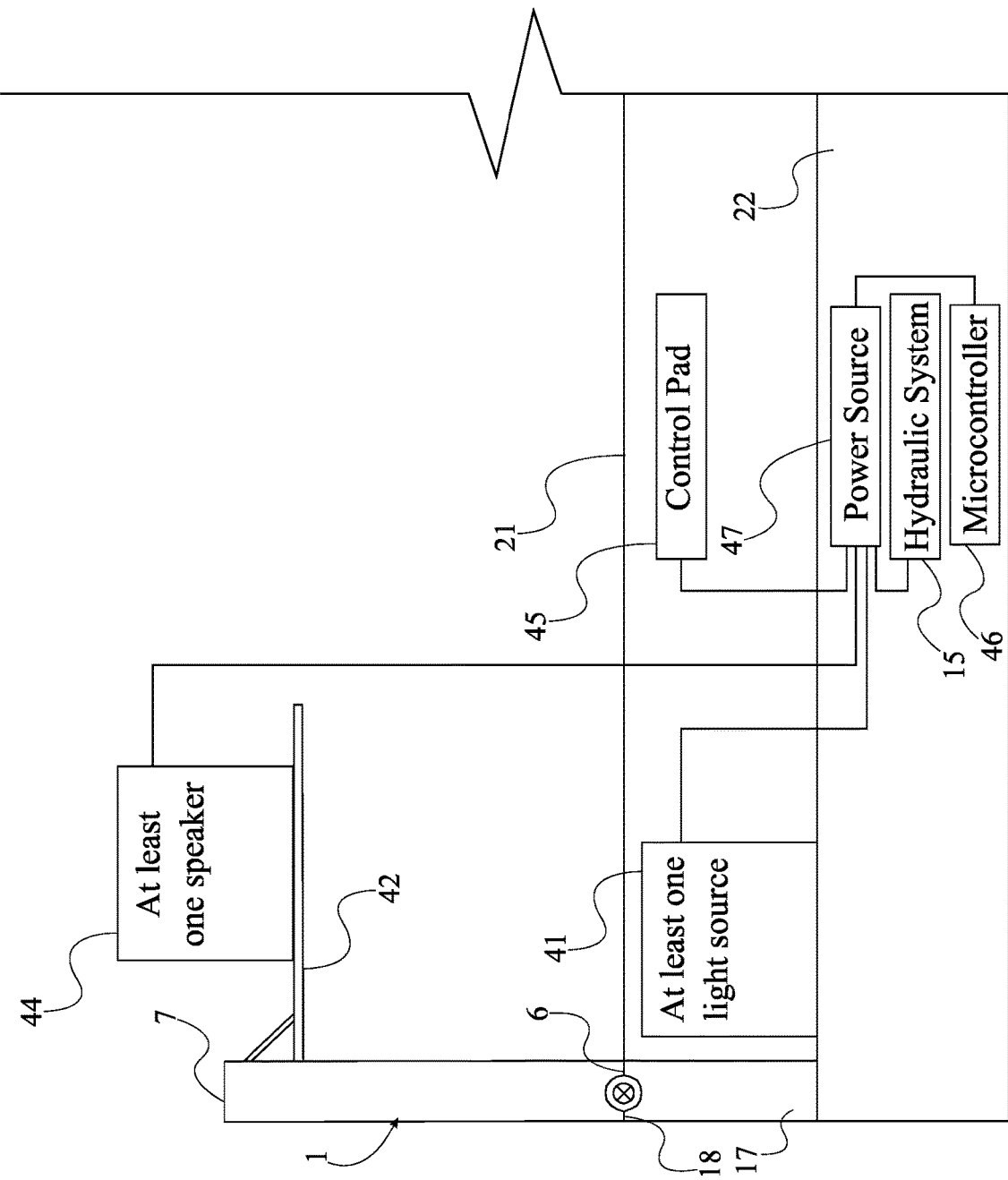
FIG. 15 is a schematic view of electrical connections the present invention with the first bed cover.

The enclosed environment is further sealed as an alternate embodiment of the present invention comprises a second lateral cover 37, at least one third supplementary fastener 38, and at least one fourth supplementary fastener 39, shown in FIG. 10 and FIG. 12. The second lateral cover 37 shields the second railing 26 and the corresponding opening between the first bed cover 1 and the second bed cover 2. The at least one third supplementary fastener 38 secures and positions the second lateral cover 37 with the collapsible cover 27. The at least one third supplementary fastener 38 is preferably velcro or a series of hooks and ties the connects the second lateral cover 37 with the collapsible cover 27. The at least one fourth supplementary fastener 39 prevents the second lateral cover 37 from flapping as the at least one fourth supplementary fastener 39 secures the second lateral cover 37 to the truck bed 16. The at least one fourth supplementary fastener 39 is preferably a series of magnets that connects the second lateral cover 37 to the truck bed 16.

The second lateral cover 37 encloses the truck bed 16 with the collapsible cover 27, the first truck bed 16, and the second truck bed 16 as the second lateral cover 37 is terminally positioned adjacent the collapsible cover 27 and is oriented perpendicular with the collapsible cover 27, seen also in FIG. 10 and FIG. 12. More specifically, a first edge 32 of the first lateral cover 31 traverses along a second edge 29 of the collapsible cover 27. The second edge 29 of the collapsible cover 27 is positioned in between the first bed cover 1 and the second bed cover 2, preferably beside the rear end of the truck opposite the first edge 28 of the collapsible cover 27. The second edge 29 of the collapsible cover 27 is positioned opposite the first edge 28 of the collapsible cover 27. A second edge 33 of the second lateral cover 37 is positioned opposite the first edge 32 of the second lateral cover 37, across the second lateral cover 37. The second edge 33 of the second lateral cover 37 is positioned adjacent the frame 17 of the truck bed 16. In order to effectively secure and position the second lateral cover 37, the first edge 32 of the second lateral cover 37 is removably attached to the second edge 29 of the collapsible cover 27 with the at least one third supplementary fastener 38. Moreover, the second edge 33 of the second lateral cover 37 is removably attached to the frame 17 of the truck bed 16 with the at least one fourth supplementary fastener 39.

In this alternate embodiment of the present invention, the present invention may further comprise a second window 40, seen in FIG. 10. The second window 40 allows individuals to view the surrounding environment between the first bed cover 1 and the second bed cover 2. The second window 40 also allows individuals within the truck bed 16 to view the surrounding environment through the second railing 26, if the second railing 26 is connected to the first bed cover 1. The second window 40 is preferably a durable, transparent plastic layer in order to preserve the flexible structure of the second lateral cover 37. The second window 40 is integrated into the second lateral cover 37, thereby allowing individuals to have a view of the surrounding environment while positioned within the truck bed 16.

In order define an enclosed space with the present invention, seen in FIG. 9 and FIG. 10, the first bed cover 1 and the second bed cover 2 are fully extended, and the first railing 25 and the second railing 26 are connected to the first bed cover 1. The collapsible cover 27 extends over and is secured to both the first bed cover 1 and the second bed cover 2. The first lateral cover 31 and the second lateral traverses across the first railing 25 and the second railing 26, respectively. The first lateral cover 31 and the second lateral cover 37 are secured to the collapsible cover 27 and the frame 17 of the truck bed 16. In the preferred embodiment of the present invention, the truck bed 16 comprises a door that is integrated into the frame 17. The cabin of the truck is positioned adjacent the truck bed 16, and the door is positioned opposite the cabin along the frame 17. The door allows individuals to enter and exit the enclosed space of the present invention. In alternate embodiments of the present invention seat cushions may rest on the bench panel 13 while in the extended configuration, providing a more comfortable private space within the truck bed 16. A variety of accessories may be positioned within the truck bed 16 and mounted onto the first bed cover 1 and the second bed cover 2 such as cup holders and coat hooks, and so on.

The environment within the truck bed 16 is enhanced as the present invention further comprises at least one light source 41, at least one first mounting bracket 42, at least one second mounting bracket 43, at least one speaker 44, a control pad 45, a microcontroller 46, and a power source 47, seen in FIG. 13, FIG. 14, FIG. 15, and FIG. 16. The at least one light source 41 provides illumination within the truck bed 16 and is mounted within the truck bed 16. More specifically, the at least one light source 41 is mounted onto the base 22 of the truck bed 16 and is oriented towards a main opening 23 of the truck bed 16. The main opening 23 of the truck bed 16 is defined by the frame 17 and is positioned opposite the base 22 of the truck bed 16. The at least one first mounting bracket 42 is fixed to the first bed cover 1, adjacent the free edge 7 of the first bed cover 1. Similarly, the at least one second mounting bracket 43 is fixed to the second bed cover 2, adjacent the free edge 7 of the second bed cover 2. The at least one first mounting bracket 42 and the at least one second mounting bracket 43 preferably uphold the at least one speaker 44. The at least one light source 41, the at least one speaker 44, and the control pad 45 are electronically connected to the microcontroller 46 in order for a user to control the light source and the at least one speaker 44. The at least one light source 41, the at least one speaker 44, the control pad 45, and the microcontroller 46 are electrically connected to the power source 47 in order for each respective component to be able to receive the necessary power. In the preferred embodiment of the present invention, the hydraulic system 15 is also electronically connected to the microcontroller 46 and is electrically connected to the power source 47 so that the user may automatically extend and retract the first bed cover 1 and the second bed cover 2 from the truck bed 16. The hydraulic system 15 is controlled by the control pad 45. The control pad 45 is preferably connected and positioned within the truck bed 16. The control pad 45 may also be positioned within the cabin of a truck and be a smart device that wirelessly communicates with the microcontroller 46.

Although the invention has been explained in relation to its preferred embodiment, it is to be understood that many other possible modifications and variations can be made without departing from the spirit and scope of the invention as hereinafter claimed.

What is claimed is:

1. A flatbed enclosure comprises:
a first bed cover;
a second bed cover;
a first side rack;
a second side rack;
a hydraulic system;
a truck bed;
the truck bed comprises a frame and a base;
the frame being perimetrically fixed to the base;
the frame being oriented perpendicular to the base;
the first bed cover and the second bed cover positioned adjacent the frame, opposite the base;
the first bed cover being hingedly engaged to a first lateral edge of the frame;
the second bed cover being hingedly engaged to a second lateral edge of the frame;
the first lateral edge being positioned opposite the second lateral edge across the truck bed;
the first side rack being positioned adjacent an inner surface of the first bed cover;
the first side rack being slidably engaged with the first bed cover;
the second side rack being positioned adjacent an inner surface of the second bed cover;
the second side rack being slidably engaged with the second bed cover; and,
the first bed cover and the second bed cover being operatively coupled with the hydraulic system, wherein the hydraulic system opens and closes a main opening of the truck bed with the first bed cover and the second bed cover.

2. The flatbed enclosure as claimed in claim 1 comprises:
a latch mechanism;
the first side rack comprises a backrest panel and a bench panel;
the first bed cover comprises a first track and a second track;

the first track and the second track being positioned opposite each other along the first bed cover;

the first track and the second track being fixed to the inner surface of the first bed cover;

the backrest panel being hingedly connected to the bench panel;

the backrest panel being oriented parallel with the first bed cover; and, the backrest panel and the bench panel being operatively coupled with the latch mechanism, wherein latch mechanism locks and releases both the backrest panel and the bench panel along the first track and the second track.

3. The flatbed enclosure as claimed in claim 2 comprises:

the backrest panel being positioned between the first track and the second track;

the bench panel being externally positioned with the first track and the second track, adjacent a first opening of the first track;

the bench panel being oriented parallel to the base of the truck bed;

a first lateral edge of the backrest panel being positioned adjacent a fixed edge of the first bed cover;

the fixed edge of the first bed cover being positioned adjacent the first lateral edge of the frame of the truck bed; and, a free edge of the first bed cover being positioned opposite the fixed edge of the first bed cover.

4. The flatbed enclosure as claimed in claim 2 comprises:

the backrest panel and the bench panel being positioned in between the first track and the second track;

the bench panel being oriented parallel to the backrest panel;

a first lateral edge of the bench panel being positioned adjacent a fixed edge of the first bed cover;

the fixed edge of the first bed cover being positioned adjacent the first lateral edge of the frame of the truck bed;

a free edge of the first bed cover being positioned opposite the fixed edge of the first bed cover; and, the bench panel being positioned in between the fixed edge of the bed cover and the backrest panel.

5. The flatbed enclosure as claimed in claim 1 comprises:

a latch mechanism;

the second side rack comprises a second backrest panel and a second bench panel;

the second bed cover comprises a first track and a second track;

the first track and the second track being positioned opposite each other along the second bed cover;

the first track and the second track being fixed to the inner surface of the second bed cover;

the second backrest panel being hingedly connected to the second bench panel;

the second backrest panel being oriented parallel with the second bed cover; and, the second backrest panel and the second bench panel being operatively coupled with the latch mechanism, wherein latch mechanism locks and releases both the second backrest panel and the second bench panel along the first track and the second track.

6. The flatbed enclosure as claimed in claim 5 comprises:

the second backrest panel being positioned between the first track and the second track;

the second bench panel being externally positioned with the first track and the second track, adjacent a first opening of the first track;

the second bench panel being oriented parallel to the base of the truck bed;

a first lateral edge of the second backrest panel being positioned adjacent a fixed edge of the second bed cover;

the fixed edge of the second bed cover being positioned adjacent the second lateral edge of the frame of the truck bed; and, a free edge of the second bed cover being positioned opposite the fixed edge of the second bed cover.

7. The flatbed enclosure as claimed in claim 5 comprises:

the second backrest panel and the second bench panel being positioned in between the first track and the second track;

the second bench panel being oriented parallel to the second backrest panel;

a first lateral edge of the second bench panel being positioned adjacent a fixed edge of the second bed cover;

the fixed edge of the second bed cover being positioned adjacent the second lateral edge of the frame of the truck bed;

a free edge of the second bed cover being positioned opposite the fixed edge of the second bed cover; and, the second bench panel being positioned in between the fixed edge of the bed cover and the second backrest panel.

8. The flatbed enclosure as claimed in claim 1 comprises:

a collapsible cover;

the collapsible cover being positioned adjacent the first bed cover and the second bed cover, opposite the frame;

a free edge of the first bed cover being positioned opposite a fixed edge of the first bed cover;

a free edge of the second bed cover being positioned opposite a fixed edge of the second bed cover;

the fixed edge of the first bed cover and the fixed edge of the second bed cover being positioned adjacent the frame;

the free edge of the first bed cover being positioned opposite the free edge of the second bed cover across the collapsible cover;

the collapsible cover traversing from the first bed cover to the second bed cover; and, the collapsible cover being suspended with the free edge of the first bed cover and the free edge of the second bed cover.

9. The flatbed enclosure as claimed in claim 8 comprises:

a first lateral cover;

at least one first supplementary fastener;

at least one second supplementary fastener;

the first lateral cover being terminally positioned adjacent the collapsible cover;

the first lateral cover being oriented perpendicular with the collapsible cover;

a first edge of first lateral cover traversing across a first edge of the collapsible cover;

the first edge of the collapsible cover being positioned in between the first bed cover and the second bed cover;

a second edge of the first lateral cover being positioned opposite the first edge of the first lateral cover, across the first lateral cover;

the second edge of the first lateral cover being positioned adjacent the frame of the truck bed;

the first edge of the first lateral cover being removably attached to the first edge of collapsible cover with the at least one first supplementary fastener; and, the second edge of the first lateral cover being removably attached to the frame of the truck bed with the at least one second supplementary fastener.

10. The flatbed enclosure as claimed in claim 9 comprises:
a first window; and,
the first window being integrated into the first lateral cover.

11. The flatbed enclosure as claimed in claim 8 comprises:
a second lateral cover;
at least one third supplementary fastener;
at least one fourth supplementary fastener;
the second lateral cover being terminally positioned adjacent the collapsible cover;
the second lateral cover being oriented perpendicular with the collapsible cover;
the second lateral cover traversing across a second edge of the collapsible cover;
the second edge of the collapsible cover being positioned in between the first bed cover and the second bed cover;
a first edge of the second lateral cover traversing along the second edge of the collapsible cover;
a second edge of the second lateral cover being positioned opposite the first edge of the second lateral cover;
the second edge of the second lateral cover being positioned adjacent the frame of the truck bed;
the first edge of the second lateral cover being removably attached to the second edge of collapsible cover with the at least one third supplementary fastener; and,
the second edge of the second lateral cover being removably attached to the frame of the truck bed with the at least one fourth supplementary fastener.

12. The flatbed enclosure as claimed in claim 11 comprises:
a second window; and,
the second window being integrated into the second lateral cover.

13. The flatbed enclosure as claimed in claim 1 comprises:
at least one light source;
at least one first mounting bracket;
at least one second mounting bracket;
at least one speaker;
a control pad;
a microcontroller;
a power source;
the at least one light source being mounted within the truck bed;
the at least one light source being oriented towards a main opening of the truck bed;
the at least one first mounting bracket being fixed to the first bed cover, adjacent the free edge of the first bed cover;
the at least one second mounting bracket being fixed to the second bed cover, adjacent the free edge of the second bed cover;
the at least one light source, the at least one speaker, and the control pad being electronically connected to the microcontroller; and,
the at least one light source, the at least one speaker, the control pad, and the microcontroller being electrically connected to the power source.

14. The flatbed enclosure as claimed in claim 1 comprises:
the hydraulic system being electronically connected to the microcontroller; and,
the hydraulic system being electrically connected to the power source.

\* \* \* \* \*